US008117204B2

(12) United States Patent
Girgensohn et al.

(10) Patent No.: US 8,117,204 B2
(45) Date of Patent: Feb. 14, 2012

(54) VIDEO BROWSER FOR NAVIGATING LINEAR VIDEO ON SMALL DISPLAY DEVICES USING A SIMILARITY-BASED NAVIGATION HIERARCHY OF TEMPORALLY ORDERED VIDEO KEYFRAMES WITH SHORT NAVIGATION PATHS

(75) Inventors: Andreas Girgensohn, Palo Alto, CA (US); Frank M. Shipman, III, College Station, TX (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1005 days.

(21) Appl. No.: 12/024,929

(22) Filed: Feb. 4, 2008

(65) Prior Publication Data

US 2009/0199099 A1    Aug. 6, 2009

(51) Int. Cl.
*G06F 17/30* (2006.01)
(52) U.S. Cl. .......................... 707/737; 725/62
(58) Field of Classification Search ............... 725/62
See application file for complete search history.

(56) References Cited

U.S. PATENT DOCUMENTS

| 5,606,654 | A * | 2/1997 | Schuur | 345/440 |
| 7,095,426 | B1 * | 8/2006 | Childress | 715/794 |
| 2006/0120624 | A1 * | 6/2006 | Jojic et al. | 382/284 |

OTHER PUBLICATIONS

Diwan et al., "Clustering Techniques for Minimizing External Path Length", 1996, Proceedings of the 22$^{nd}$ VLDB Conference Mumbai (Bombay), India, pp. 342-353.*
An, C.-H., et al., "Fractal Image Compression by Improved Balanced Tree Clustering," Proceedings of SPIE, vol. 3164, Applications of Digital Image Processing XX, pp. 554-562 (1997).
Geva, S., "K-Tree: A Height Balanced Tree Structured Vector Quantizer," Proceedings of the 2000 IEEE Signal Processing Society Workshop, vol. 1, pp. 271-280 (2000).
Girgensohn, A., et al., "Home Video Editing Made Easy—Balancing Automation and User Control," Proceedings of Human-Computer Interaction (INTERACT '01), IOS Press, Tokyo, Japan, 8 pages (2001).
Zhang, T., "Birch: An Efficient Data Clustering Method for Very Large Databases," Proceedings of the 1996 ACM SIGMOD International Conference on Management of Data, Montreal, Canada, pp. 103-114 (1996).

* cited by examiner

*Primary Examiner* — Khanh Pham
*Assistant Examiner* — Alexander Khong
(74) *Attorney, Agent, or Firm* — Fliesler Meyer LLP

(57) ABSTRACT

A computer-based method is provided for enabling navigation of video using a keyframe-based video browser on a display device with a limited screen size, for a video segmented into video shots. The video shots are clustered by similarity, while temporal order of the video shots is maintained. A hierarchically organized navigation tree is produced for the clusters of video shots, while the path lengths of the tree are minimized.

20 Claims, 16 Drawing Sheets

| Navigation Path Length | Alternative 1 | Alternative 2 | Alternative 3 |
|---|---|---|---|
| 1 | - | - | - |
| 2 | 17 | 10 | 20 |
| 3 | 112 | 119 | 48 |
| 4 | - | - | 54 |
| 5 | - | - | 7 |
| Average Navigation Path Length | 2.87 | 2.92 | 3.37 |

FIG. 16

VIDEO BROWSER FOR NAVIGATING LINEAR VIDEO ON SMALL DISPLAY DEVICES USING A SIMILARITY-BASED NAVIGATION HIERARCHY OF TEMPORALLY ORDERED VIDEO KEYFRAMES WITH SHORT NAVIGATION PATHS

BACKGROUND OF THE INVENTION

1. Field of the Invention

The present invention relates to video browsers on display devices.

2. Description of the Related Art

When a user plays a video on a display device, it is desirable to access a particular scene in the video. A navigation aid on the display device enables the user to navigate through a video to the desired scene. For digital video discs (DVDs), the DVD provides scene indices of a stored video to the user in the form of keyframes. For most automatically generated navigation aids, on the other hand, shots are used instead of scenes because it is difficult to automatically detect scenes in a video. Because shots are much shorter than scenes, this leads to a much larger number of keyframes, usually more than ten for each minute of video. In order to access a particular shot, the DVD approach of displaying a few keyframes on a screen, such as a television screen or computer screen, does not scale up well to hundreds of keyframes. The situation is even worse on small devices such as mobile phones that only have room for a few keyframes on each screen.

Further, most interfaces for navigating video rely on either specially designed remotes, for example, a TIVO remote or a mouse. Navigating video on devices with a small display and no mouse, such as a cell phone, is difficult due to limited space to present information about the video and limited options for user input.

What is needed is a better process for automatically enabling navigation of video shots on display devices, and especially on small display devices.

SUMMARY OF THE INVENTION

A computer-based method is provided for enabling navigation of video using a keyframe-based video browser on a display device with a limited screen size, for a video segmented into video shots. The video shots are clustered by similarity, while temporal order of the video shots is maintained. A hierarchically organized navigation tree is produced for the clusters of video shots, while the path lengths of the tree are minimized.

BRIEF DESCRIPTION OF THE DRAWINGS

Preferred embodiment(s) of the present invention will be described in detail based on the following figures, wherein:

FIG. 16 shows an example table comparing process results for processes producing the trees in FIGS. 13-15, according to embodiments of the present invention.

DETAILED DESCRIPTION OF THE INVENTION

I. Introduction

Figure 1:
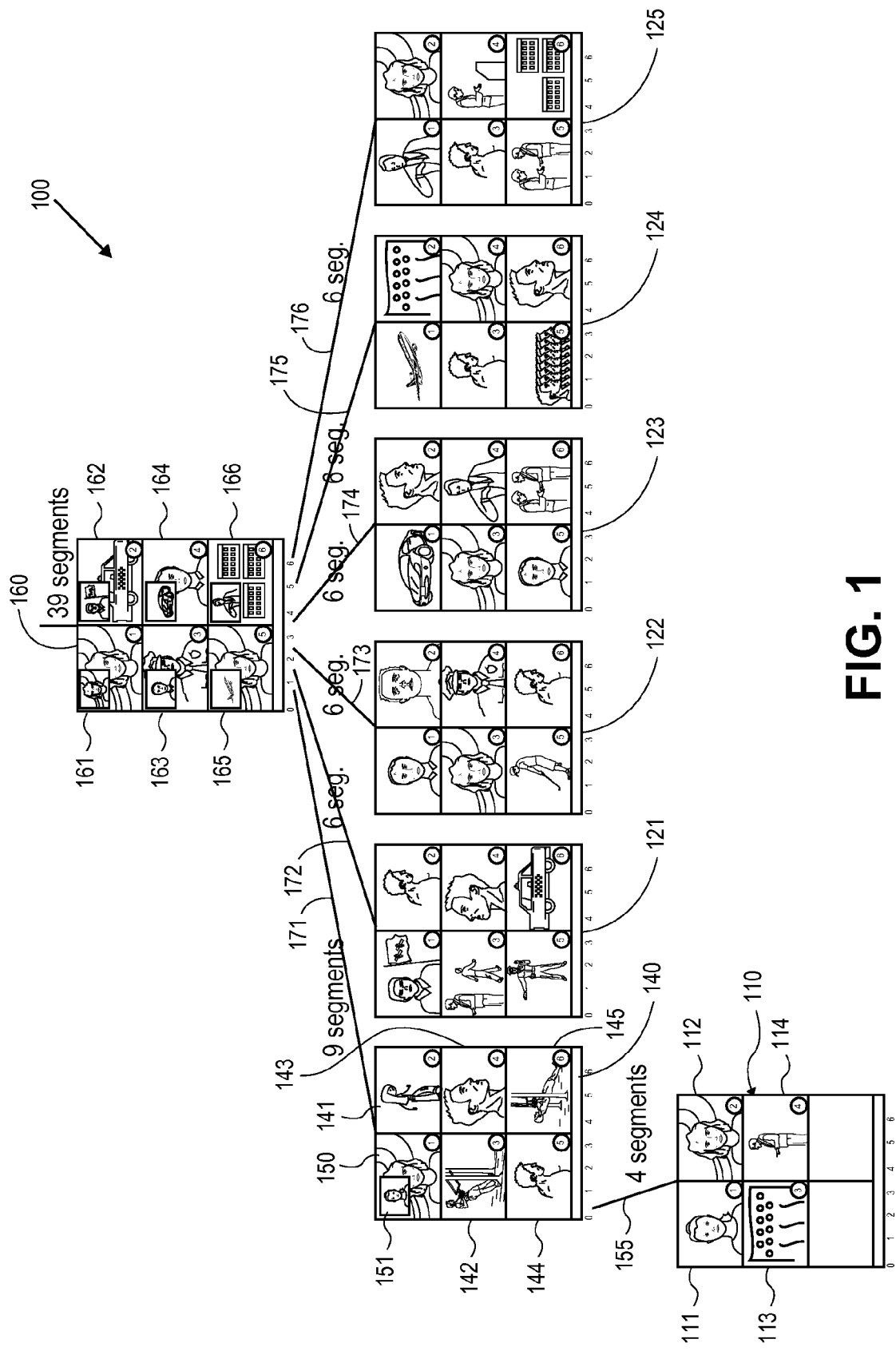
FIG. 1 shows an example hierarchy of video shots 100, according to embodiments of the present invention.

Navigation aids for video display devices can include clustering of shots into a hierarchy of shots. Clustering is the classification of objects into different groups. Hierarchical processes find successive clusters using previously established clusters. An agglomerative hierarchical process is a "bottom-up" clustering approach that begins with each element as a separate cluster and merges them into successively larger clusters. Agglomerative hierarchical clustering is well suited for creating clustering trees that maintain temporal order. Rather than considering all pairs of clusters when deciding which cluster to merge next, only pairs of clusters that are temporally adjacent are considered. This greatly reduces the time complexity of the clustering process. Another type of hierarchical clustering is "top-down" clustering, which begins with the whole set and proceeds to divide it into successively smaller clusters. Top-down clustering approaches, for example k-means, are not as well suited for maintaining temporal order, however. On the other hand, top-down clustering approaches can be adapted to create balanced trees. A balanced tree is a tree that has its height kept as small as possible. The height of a tree is the longest path from the root node to a leaf node. A tree with a single node has a height of one.

Currently, one current agglomerative hierarchical clustering process with temporal order does not constrain the number of elements in a cluster. This results in an unbalanced cluster tree. Other current processes have combined clustering with balanced trees, but only for top-down clustering processes and without maintaining temporal order.

The present invention uses a bottom-up clustering approach combined with a top-down process for limiting the number of cluster elements. Rather than creating a complete clustering tree, the process processes each level of the cluster tree separately and does not use the tree structure generated by the agglomerative hierarchical clustering.

A design is presented that enables navigation within linear video on a cell phone or other small display device. The video is divided into video shots and is segmented into a hierarchy of video shots. The design presents a hierarchy of screens. Each screen includes a grid of keyframes, and these keyframes each represent either one or more shots. A keyframe is a frame or snapshot of a point in time in the video shot. When an element of the grid represents a group of shots, both the most important shot in the group and the first shot in the group are shown, and the group of shots can be reached by navigating the tree. A timeline shows the portion of the video associated with each of the elements in the visible grid. Users navigate through the hierarchically grouped shots to select a starting point for playing the video. To aid a user's navigation, video shots are kept in temporal order and clustered by visual similarity. The clustering by similarity is performed to ensure short navigation paths to all video shots. The clustering by similarity is an approximation because constraints on the lengths of navigation paths can prevent similar video shots from being grouped together.

It is desirable for such a tree to maintain the temporal order of the shots to provide a predictable navigation to the user. It is also desirable to have a fairly balanced tree to avoid very long navigation paths. Shots should be grouped by a criterion such as visual similarity to make it easier for the user to choose a navigation path.

The requirement of keeping shots in temporal order can cause very unbalanced cluster trees when using clustering criteria such as visual similarity. On the other hand, while a cluster tree that is solely based on visual similarity and not on temporal constraints is usually more balanced, it does not offer the same predictability to the user. The present invention describes a hierarchical clustering approach based on a shot similarity measure that maintains temporal order, while also producing a fairly balanced tree, where the average navigation path length is only slightly longer than that in a balanced tree.

II. Technical Details

FIG. 1 shows an example hierarchy of video shots 100, according to embodiments of the present invention. In this example, thirty-nine video shots are organized into a hierarchical structure, or tree. The video shots are represented by keyframes in the leaves of the tree. These leaves have been grouped into seven clusters in the tree. Cluster 110 contains four of the leaves, or video shots 111-114. Five clusters 121-125 each contain six leaves, or video shots. Cluster 140 contains five leaves, or video shots 141-145.

The video element 150 in the upper left corner of cluster 140 is a keyframe that represents a video shot. A second keyframe 151 overlaid onto this keyframe, or picture-in-picture, represents the four video shots 111-114 in cluster 110. This representation is shown by branch 155 that is labeled "4 segments" or shots. The picture-in-picture in this example indicates the first keyframe 111 of video shots in cluster 110. Thus, the tree can be descended from video element 150 via branch 155 to leaves in cluster 110. Cluster 160 is the root of the tree. Cluster 160 contains six video elements 161-166. Each of these video elements is a picture-in-picture, and thus represents clusters of video shots further down the tree. These representations are shown by branches 171-176. Branch 171 is labeled "9 segments" for the five video shots 141-145 in cluster 140 plus the four video shots in cluster 110. Branches 171-176 are labeled "6 seg." for the six video shots in each of clusters 121-126, respectively. Thus, the tree can be descended from video elements 161-166 via branches 171-176 to a video element and leaves in cluster 140 and to leaves in clusters 121-125.

The example tree in FIG. 1 has a height of three, with cluster 160 at the first level, cluster 110 at the third level, and the other clusters at the second level. This tree also has a branching factor of six, meaning that each cluster in the tree can contain no more than six elements, whether they are picture-in-picture elements and/or video shot elements.

Figure 2:
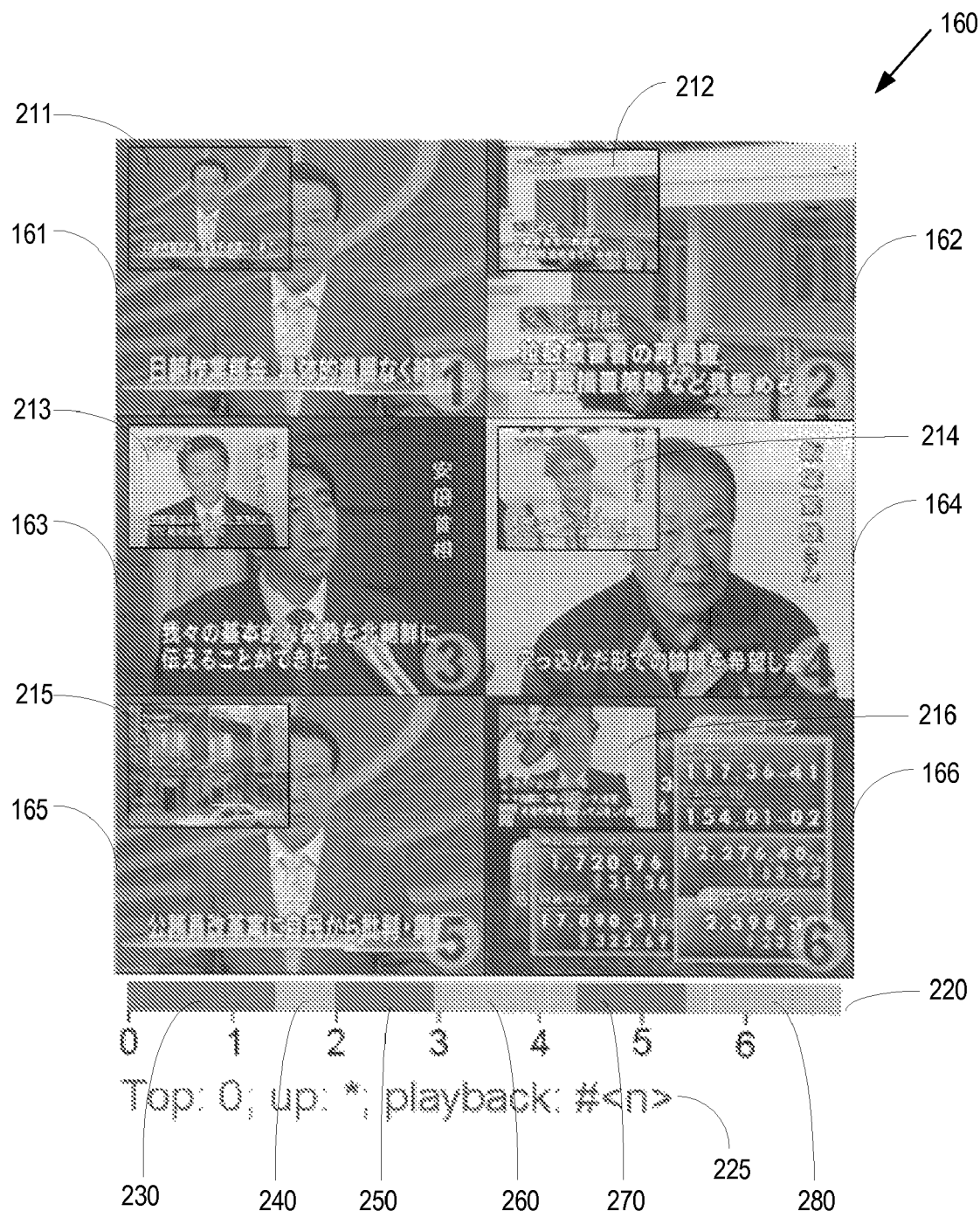
FIG. 2 shows an example design of the video browser that represents the entire video, which is shown as the root of the hierarchy in FIG. 1, according to embodiments of the present invention.
Figure 3:
FIG. 3 shows an example design of the video browser that represents a cluster in an intermediate hierarchy level of FIG. 1, according to embodiments of the present invention.
Figure 4:
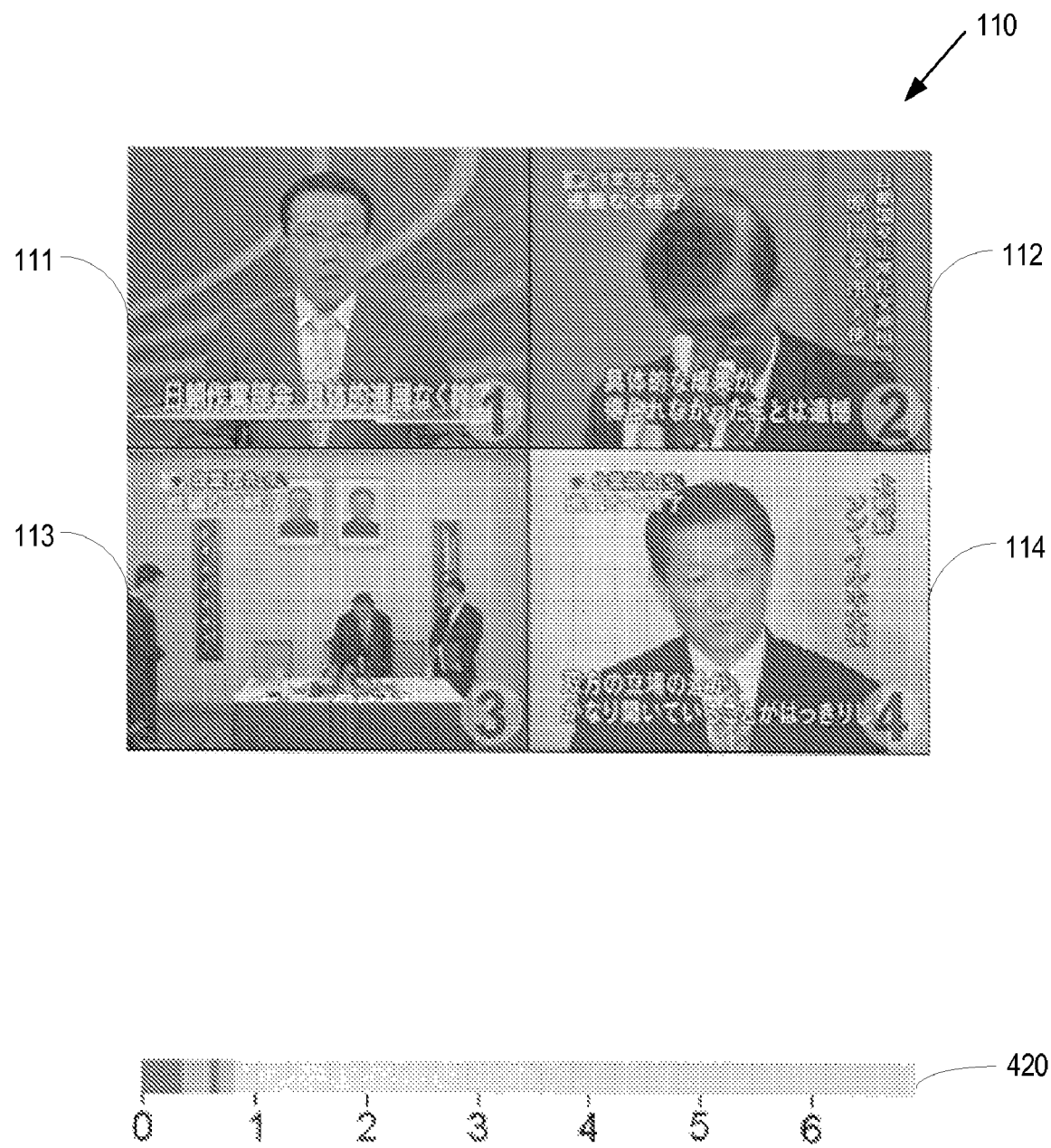
FIG. 4 shows an example design of the video browser that represents a cluster at the lowest hierarchy level of FIG. 1, according to embodiments of the present invention.

FIGS. 2-4 show the narrowing focus that occurs as the user navigates through the hierarchy of video shots shown in FIG. 1.

FIG. 2 shows an example design of the video browser that represents the entire video 160, which is shown as the root of the hierarchy in FIG. 1, according to embodiments of the present invention. The design includes a two-by-three grid of video elements. The layout of the video elements represents an entire video. These six video elements 161-166 are from cluster 160, or the root of the tree, from FIG. 1. A video element can be a keyframe that represents a video shot. A video element can also be a picture-in-picture that represents another cluster of video shots and/or picture-in-picture elements further down the tree. In this example, the six video elements are picture-in-picture elements. For a picture-in-picture, a second keyframe is overlaid onto the first keyframe. The second keyframe is generally overlaid in the upper left corner of the video element but can be overlaid in any other area of the video element. For example, the six video elements 161-166 each have second keyframes 211-216 overlaid in the upper left corner. Additional keyframes and information can also be overlaid onto any area of the video element. For example, the video elements are numbered one through six, as shown by numbers overlaid onto the video elements in their corresponding lower right corners.

The grid of video elements 160 is set above a video timeline 220 and context-sensitive help 225. The video timeline shows the length of the entire video and the portions of the video that are represented by the video elements in the grid. For the video timeline 220 shown below the grid 160, the numbers of the video timeline represent the length of time in minutes of the entire video. This example video is seven minutes in length. The video timeline content is divided into portions, each portion representing the time length of a corresponding video element relative to the total video time length. Each alternating colored portion, as it appears in the video timeline, corresponds to one of the numbered video elements. In all of the figures, the portions are shown as alternating colors but can be shown as separate colors. FIG. 2 shows six portions in the video timeline for the six video elements. The first portion 230 is about 1.5 minutes long, the second portion 240 is about 0.5 minutes long, the third portion 250 is just under a minute long, the fourth portion 260 is about 1.5 minutes long, the fifth portion 270 is about a minute long and the sixth portion 280 is about a 1.5 minutes long. In embodiments, the timeline numbers can represent other time units. In embodiments, the timeline content can be shown in other ways, such as alternating or separate patterns.

Below the video timeline 220, context-sensitive help 225 can be displayed to aid the user in navigating the browser. In particular, the help text indicates how to navigate within the hierarchy of video shots and how to begin playing the video. In this example, the help text provides additional interaction options. For "Top: 0," if the user presses "0" on his or her device, the main screen will be displayed, meaning that the video elements that represent the entire video will be displayed. FIG. 2 shows the main screen for this example video. For "up: *," if the user presses "*," the screen one level up in the video hierarchy will be displayed. For "playback: #<n>," if the user presses "#" and one of the six numbers one to six, the browser will play the video from the start of the corresponding subcluster. Further, if the user presses one of the six numbers one to six, the browser will navigate down to the corresponding subcluster, or descend into the tree of FIG. 1, and the screen corresponding to the next level of the tree will be displayed.

FIG. 3 shows an example design of the video browser that represents a cluster in an intermediate hierarchy level of FIG. 1, according to embodiments of the present invention. The design includes a two-by-three grid of video elements, as in FIG. 2, because the same display device is used for both. The layout of the video elements represents a portion of the video. These six video elements 141-145 and 150 are from cluster 140 on the second tree level of FIG. 1. In this example, video element 150 is a picture-in-picture elements, and video elements 141-145 are each a keyframe that represents a video shot. The video elements are numbered one through six, as shown by numbers overlaid onto the video elements in their corresponding lower right corners The grid of video elements 140 is set above a video timeline 320. The video timeline 320 indicates the length of each video element. The length of the video shots in cluster 140 is about 1.5 minutes. Each alternating colored portion of the timeline, as it appears in the video timeline, corresponds to one of the numbered video elements. The gray area of the timeline is covered by other parts of the tree. FIG. 3 shows six portions in the video timeline for the six video elements. The first portion 330 is about 0.8 minutes long, the second and third portions 340 and 350 are each about 1 minutes long, the fourth portion 360 is about 0.3 minutes long, and the fifth and sixth portions 370 and 380 are about 0.1 minutes long.

The video timeline 320 can be set above context-sensitive help (not shown), as shown in FIG. 2. The context-sensitive help for FIG. 3 works in a similar manner as for FIG. 2. In the example of FIG. 3, however, for "playback: #<n>," if the user presses one, the browser will descend into the tree of FIG. 1 and the screen corresponding to the next level of the tree will be displayed. For "playback: #<n>," if the user presses any of two through six, the browser will play the video shot that corresponds to the numbered keyframe.

FIG. 4 shows an example design of the video browser that represents a cluster at the lowest hierarchy level of FIG. 1, according to embodiments of the present invention. The design includes a two-by-three grid of video elements, as in FIGS. 2 and 3, because the same display device is used for all three. The layout of the video elements represents a portion of the video. These four video elements 111-114 are from cluster 110 on the lowest tree level of FIG. 1. These video elements are each a keyframe that represents a video shot. The video elements are numbered one through four, as shown by numbers overlaid onto the video elements in their corresponding lower right corners The grid of video elements 110 is set above a video timeline 420. The video timeline 420 indicates the length of each video element. The length of the video shots in cluster 110 is about 0.8 minutes. Each alternating colored portion of the timeline, as it appears in the video timeline, corresponds to one of the numbered video elements. The gray area of the timeline is covered by other parts of the tree.

The video timeline 420 can be set above context-sensitive help (not shown), as shown in FIG. 2. The context-sensitive help for FIG. 4 works in a similar manner as for FIG. 2. In the example of FIG. 4, however, this lowest tree level does not have links to other keyframe screens. For "playback: #<n>," if the user presses any of numbers one through six, the browser will play the video shot that corresponds to the numbered keyframe.

Figure 5:
FIG. 5 shows an example design of the video browser that includes a two-by-two grid of video elements, according to embodiments of the present invention.
Figure 6:
FIG. 6 shows an example design of the video browser that includes a three-by-two grid of video elements, according to embodiments of the present invention.
Figure 7:
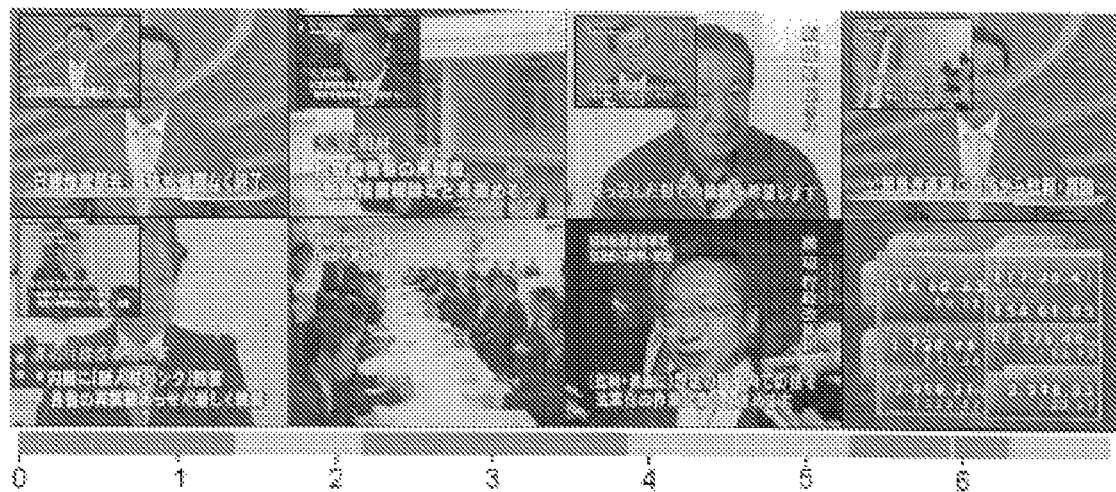
FIG. 7 shows an example design of the video browser that includes a four-by-two grid of video elements, according to embodiments of the present invention.
Figure 8:
FIG. 8 shows an example design of the video browser that includes a four-by-three grid of video elements, according to embodiments of the present invention.
Figure 9:
FIG. 9 shows an example design of the video browser that includes four-by-four grid of video elements, according to embodiments of the present invention.

FIGS. 5-9 show example design of the video browser that includes two-by-two, three-by-two, four-by-two, four-by-three, and four-by-four grids of video elements, respectively, according to embodiments of the present invention. The number of video elements in the video browser design varies based on the size of the display. For small display devices such as cell phones, the number of elements can be between a two-by-two grid for the smaller phone displays, such as in FIG. 5, up to a four-by-four grid for larger displays, as shown in FIG. 9. The grids of elements are defined as columns-by-rows. The design also works for non-square grids, such as two-by-three, as shown in FIG. 2, and three-by-two, as shown in FIG. 6. FIGS. 2 and 6 contain the same video elements but in different layouts. Other examples of non-square grids are four-by-two, as shown in FIG. 7, three-by-four, and four-by-three, as shown in FIG. 8. In embodiments, other combinations of grid dimensions can be used.

FIG. 9 shows an example design of the video browser that includes numbers and letters overlaid onto the video elements. In this example four-by-four grid, numbers one through nine are overlaid onto the first nine video elements, and letters "A" through "G" are overlaid onto the remaining seven video elements. Thus, the user can select one of the sixteen video elements by pressing one through nine or "A" through "G" on his or her device. FIG. 8 similarly shows the use of numbers and letters overlaid onto the video elements. FIGS. 5 and 7 are examples of video elements that do not include overlaid letters and numbers.

The design of each grid video element varies depending on whether the video element represents a single shot or a cluster of shots. In the case that the video element represents a single shot, the video element shows a single keyframe from the shot, as shown in the video elements 111-114 of FIG. 4. In the case where the video element represents a cluster of shots, the video element shows a keyframe from the "most important" shot in the cluster based on some function of importance. A keyframe from the temporally first shot overlays the keyframe from the most important shot. The result is a picture-in-picture, as shown in the top-left element of FIG. 3. Each grid video element also has an optional overlay with wording indicating which key on the keypad will navigate into the set of shots or which key will begin playback of the shot. This overlay is removed in the case of touch screens.

Figure 10:
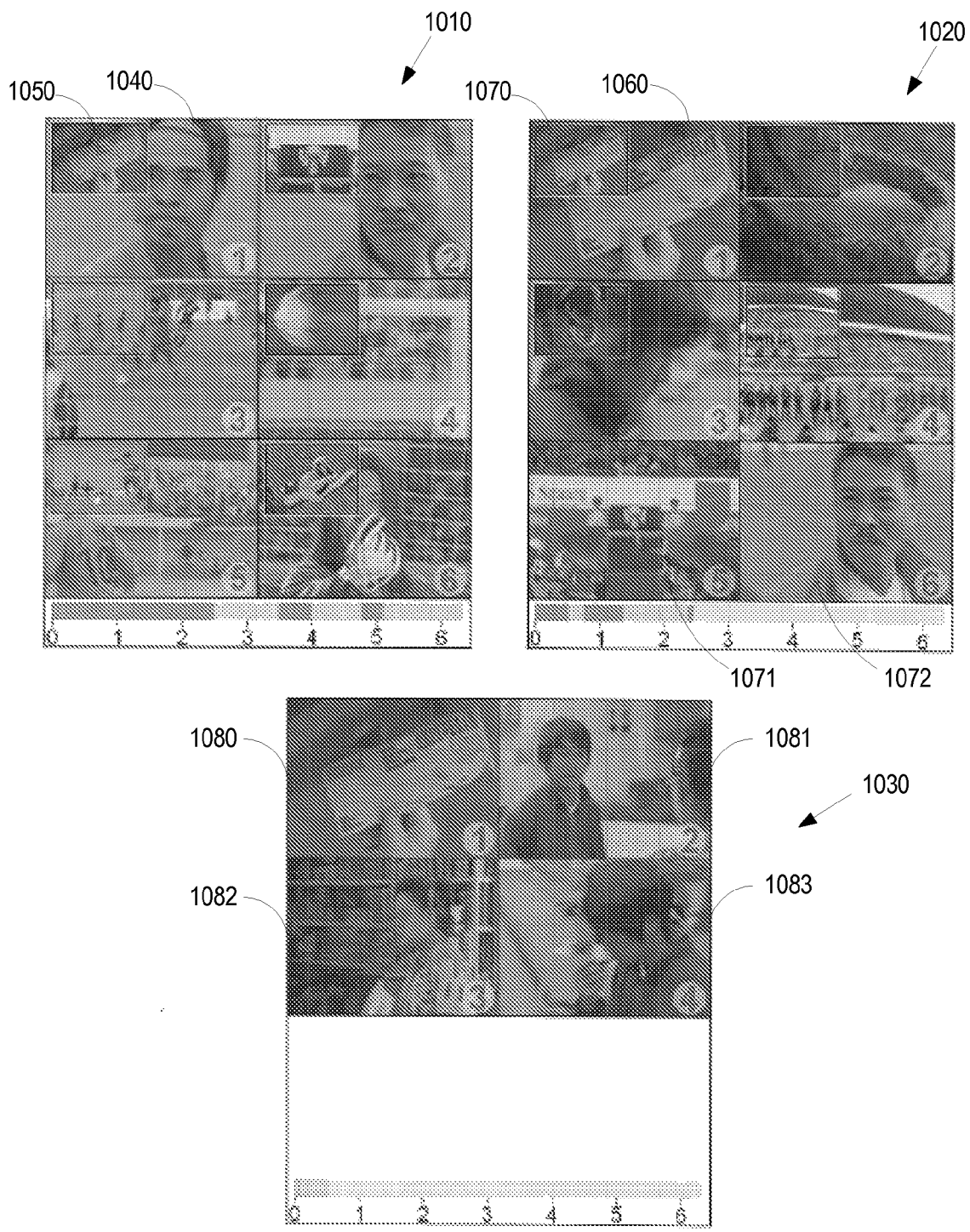
FIG. 10 shows an example of navigation through the keyframes of video shots on a small device, according to embodiments of the present invention.

FIG. 10 shows an example of navigation through the keyframes of video shots on a small device, according to embodiments of the present invention. Three screens 1010, 1020, and 1030 are shown that represent the complete video. Screen 1020 represents part of the video after the user selects the first video element 1040 of first screen 1010. Video element 1040 shows the most important keyframe of the video shots represented in screen 1020, as well as the overlaid keyframe 1050 that represents the temporally first shot that corresponds to first video element 1060 in screen 1020. Screen 1030 represents part of the video after the user selects the first video element 1060 of second screen 1020. Video element 1060 shows the most important keyframe of the video shots represented in screen 1030, as well as the overlaid keyframe 1070 that represents the temporally first shot that corresponds to first video element 1080 in screen 1030.

In screen 1020, the two video elements 1071 and 1072 are the two most important keyframes for two video shots. The user can playback either of these two video shots. In screen 1030, the four video elements 1080-1083 are the most important keyframes for four video shots. In screen 1030, the user can playback any of these four video shots. The timeline below each screen represents the time of the video in minutes and shows the selected part of the video and the video elements in alternating colors.

For the distance function that determines cluster distances, the inverse of any reasonable visual similarity measurement can be used. For example, a color histogram or a color correlogram can be used. Other distance functions used to determine cluster distances are text similarity based on a text transcript and occurrence of the same recognized faces.

For the distance function that determines similarity of shots, the inverse of any reasonable visual similarity measurement can be used. For example, a color histogram or a color correlogram can be used. A color histogram is a representation of the distribution of colors in an image, derived by counting the number of pixels of each of a given set of color ranges in a typically two-dimensional (2D) or three-dimensional (3D) color space. A color correlogram computes the spatial correlation of pairs of colors as a function of the distance between pixels. Details regarding color histograms and color correlograms are not discussed in more detail here as they are well known in the related arts. Other examples of distance functions used for visual similarity are text similarity based on a text transcript and occurrence of the same recognized faces.

For selecting the "most important" or representative shot, several different approaches can be used. Details regarding functions of importance are not discussed in more detail here as they are well known in the related arts. In embodiments, approaches for selecting this representative shot in the set of shots can be used, whether or not the representative shot is the most important shot. In embodiments, examples of other approaches for selecting a representative shot are the longest shot, the shot with the most audio energy, and the shot with the most text if the video has a transcript. Another approach is to select the shot that is most similar to the other shots in the cluster using the clustering distance measure.

When using the clustering distance measure, the "most important" shot is the shot that is most similar to the other shots in the cluster, and least similar to the shots in sibling clusters. For a given cluster, a sibling cluster is a cluster at the same level in the tree. Similarity is determined for each candidate shot by computing the total distance to the other cluster members and by subtracting the weighted total of the total distance to all shots that are members of sibling clusters. The shot with the least total distance is selected as the most important shot. The use of sibling clusters might cause a shot to be selected at one level but not to show up at the next lower level because it does not have enough discriminative power for sibling clusters at that level. By setting the weight for the distances to sibling clusters to zero, only similarities to members of the cluster itself would be considered. For example, in FIG. 10, this is the case for video element 1040 that is not representative of any of the six clusters in screen 1020 because it is not dissimilar enough to the other clusters. Overlaid keyframe 1050 is the very first shot of the cluster, and thus it shows up again as 1060 and 1080.

As mentioned above, a bottom-up clustering approach combined is used with a top-down process for limiting the number of cluster elements. Rather than creating a complete clustering tree, the process processes each level of the cluster tree separately and does not use the tree structure generated by the agglomerative hierarchical clustering. Details of the process are discussed in relation to FIG. 11, FIG. 12A, and FIG. 12B.

Figure 11:
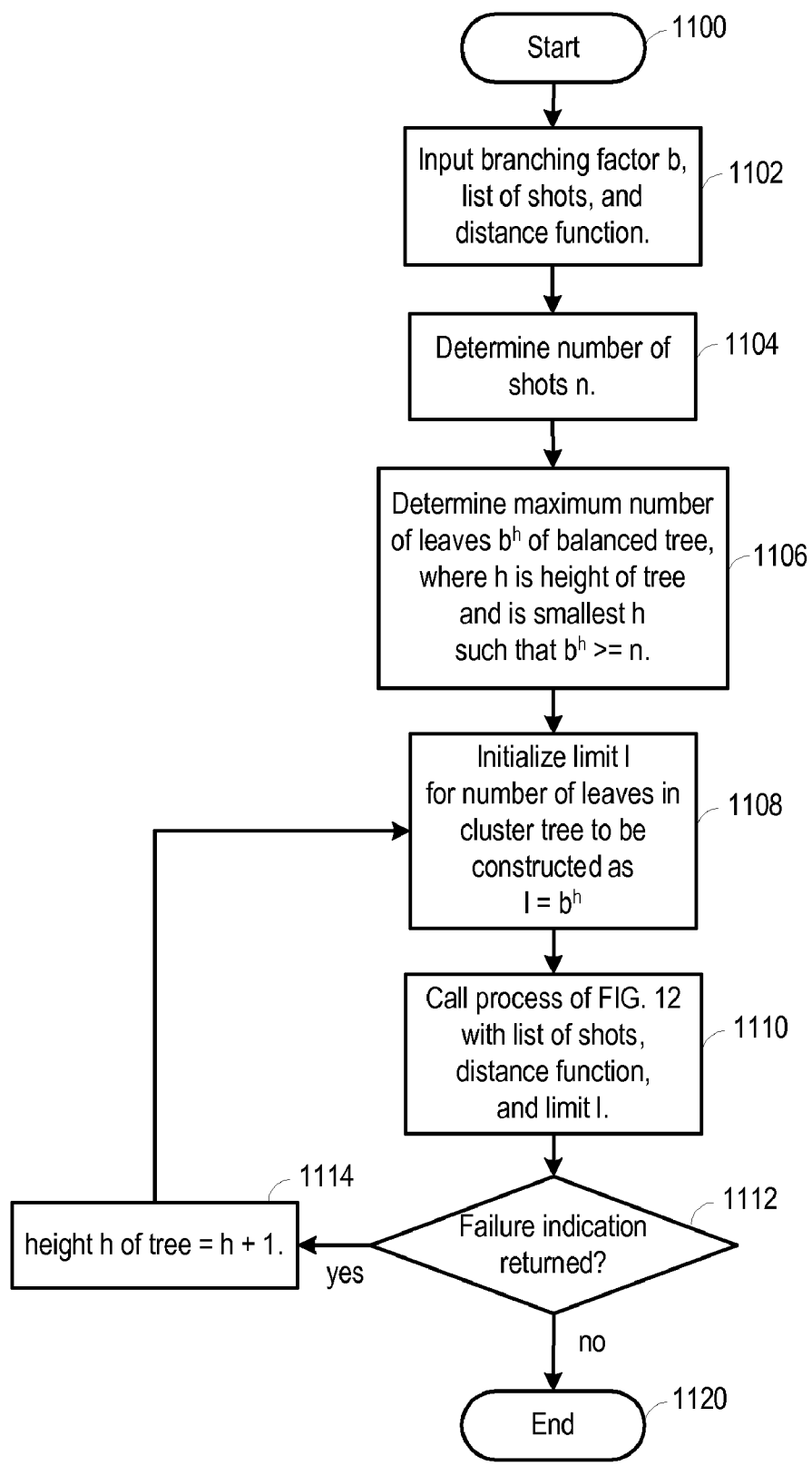
FIG. 11 shows an example process flow to initialize clustering and to invoke a recursive clustering process, according to embodiments of the present invention.
Figure 12A:
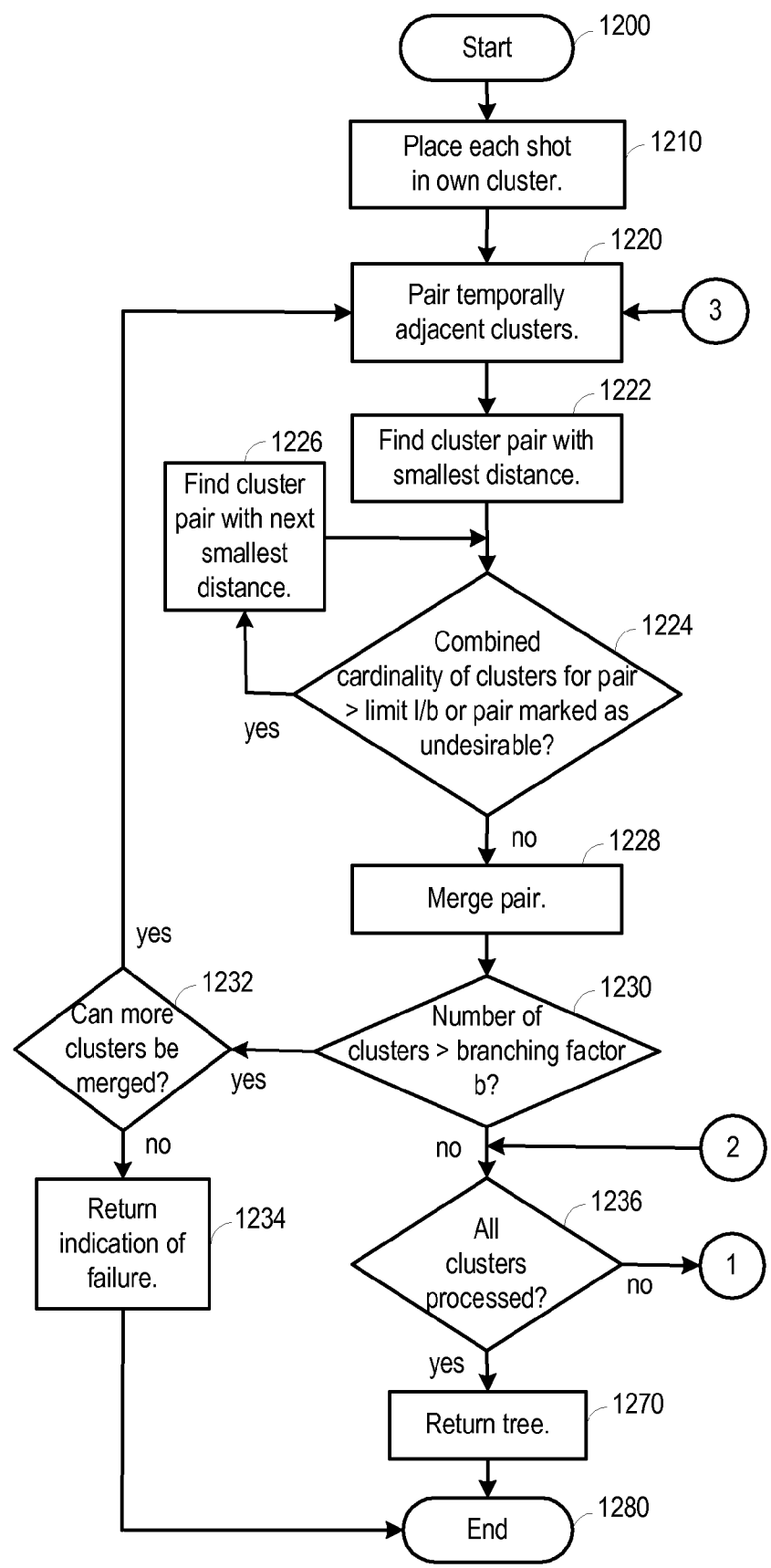
FIGS. 12A-B show an example recursive process that applies the bottom-up hierarchical clustering process with temporal order, combined with top-down cluster element number limitation, according to embodiments of the present invention.
Figure 12B:
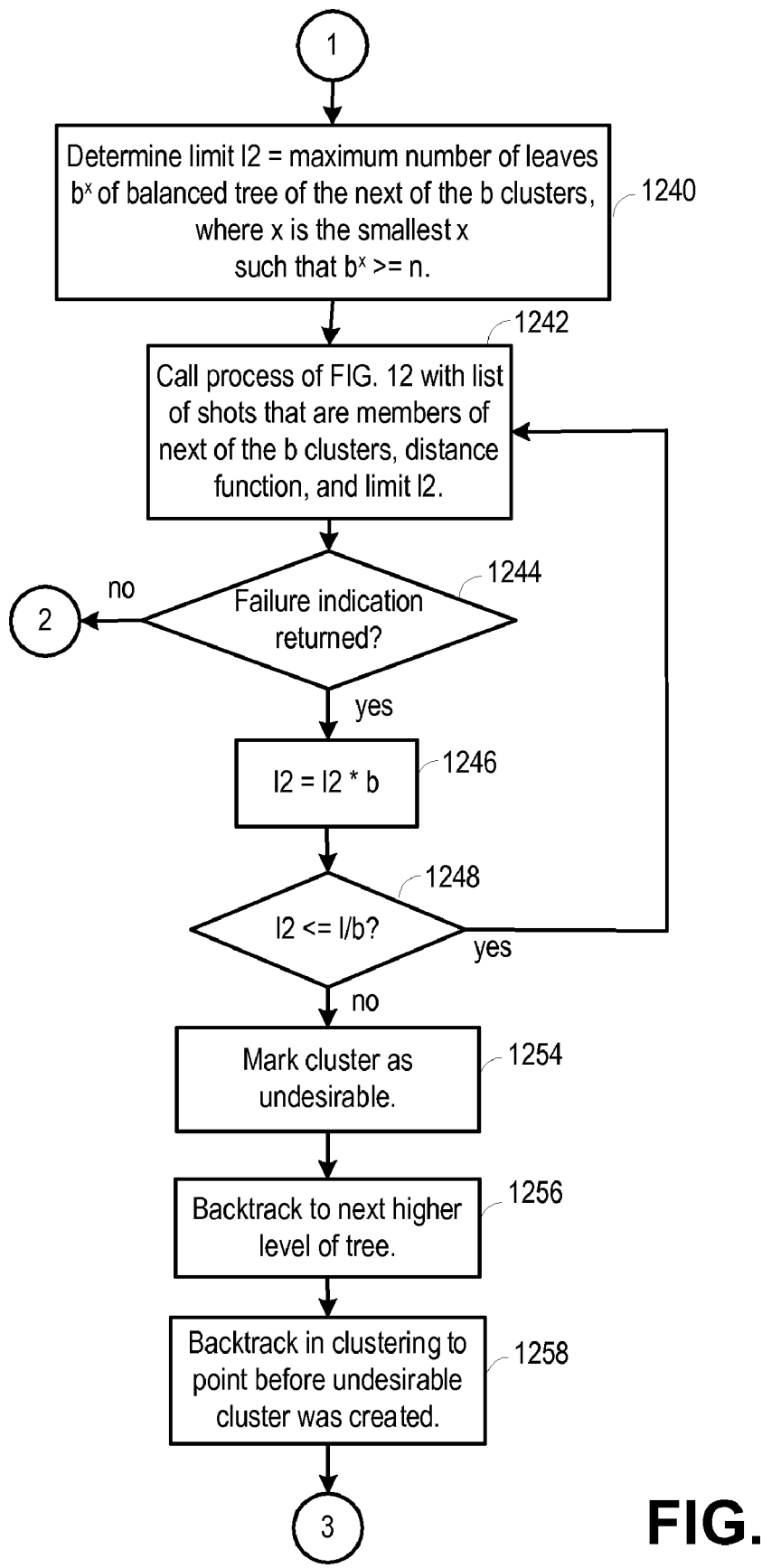

The basic outline of the clustering process in FIG. 11, FIG. 12A, and FIG. 12B is as follows:

1. Determine the maximum number of leaves in the tree as the next higher power of the branching factor.
2. Cluster all video shots into b clusters where no cluster may have more than $b^{h-1}$ elements. Only merge pairs of clusters that have temporally adjacent elements and skip pairs where the merged cluster would have too many elements. Stop merging once there are only b clusters.
3. Recursively cluster the elements of the subclusters, reducing the maximum number of cluster elements by a factor of b.
4. If subclustering a cluster produces more than b subclusters because there are no more subclusters that can be merged, mark the cluster as undesirable, backtrack in the clustering at the higher level to the point where the undesirable cluster was created, and repeating clustering while treating undesirable clusters just like clusters that would exceed the maximum number of elements.
5. If the root of the tree has more than b subclusters, increment the maximum height of the tree and start over.

FIG. 11 shows an example process flow to initialize clustering and to invoke a recursive clustering process, according to embodiments of the present invention. The process begins in step 1100. In step 1102, three inputs are input into the process. The first input is the tree branching factor "b," which is the number of video elements that can be displayed on a particular device display screen. The second input is the list of shots in the video in temporal order. The third input is a distance function used to determine cluster distances. The cluster distance can be computed as the maximum pair-wise distance of the elements in the combined cluster or as the distance of the two video shots that form the boundary between the clusters to be merged.

For example, assume the following shots in temporal order, "a b c d e f g," and assume they are clustered such that cluster A contains the elements a-d and cluster B contains the elements e-g. If using the maximum pair-wise distance for this example, the distance between A and B is the maximum of the distances ae, af, ag, be, bf, bg, ce, cf, cg, de, df, or dg. If using the distance of the two video shots that form the boundary between the clusters to be merged, the distance between A and B is the distance at the temporal boundary of the clusters A and B, that is, the distance between elements d and e.

In step 1104, the number of shots "n" is determined from the list of shots. In embodiments, the number of shots is alternatively input in step 1102. In step 1106, the maximum number of leaves in a selected balanced tree with height "h" and branching factor "b" is determined as $b^h$. This determination is performed by finding the minimum height "h" of a balanced tree for the given branching factor "b" that could hold all video shots in leaves. This "h" is the smallest power of the branching factor that is not smaller than the number of shots, such that $b^h >= n$. Thus, in step 1106, the minimum height "h" of the balanced tree is determined as well.

For example, suppose a branching factor b=6 is input in step 1106, and n=100 shots is determined in step 1108. In step 1106, the smallest balanced tree that can hold the shots as leaves can hold up to $b^h=(6^3)=216$ shots. This is determined by working through the powers of the branching factor in ascending order starting with h=1. For h=1, $b^h=(6^1)=6$ is less than 100 and is thus not large enough to hold the 100 shots. For h=2, $b^h=(6^2)=36$ is less than 100 and is thus not large enough to hold the 100 shots. For h=3, however, $b^h=(6^3)=216$ is greater than the 100 shots, and a tree having 216 leaves is thus large enough to hold the 100 shots.

In step 1108, the limit "l" for the number of leaves in the cluster tree to be constructed is initialized to be the maximum number of leaves $b^h$, determined in step 1106, or limit $l=b^h$. This limit is used to keep the cluster tree balanced. This limit will be used in the process later as l/b to keep the cluster tree balanced. Assume the example above for a branching factor of b=6 and a number of shots n=100, as well processing of the first iteration of the recursion. This limit for the number of elements in each cluster is the smallest balanced tree that can hold the shots as leaves, or the maximum number of leaves in the tree $b^h=216$ found in step 1106, divided by the branching factor b=6, or 216/6=36. Alternatively, the new limit for the number of elements in a cluster can be the largest power of the branching factor that is smaller than the number of elements in the cluster to be divided. In this case, the generated subtree may have shorter navigation paths at the expense of grouping similar shots together.

In step 1110, the recursive process in FIGS. 12A-B is invoked with three parameters, which are the list of shots input in step 1102, a distance function, and the limit l initialized in step 1108.

In step 1112, if the process of FIGS. 12A-B returns an indication of failure, then in step 1114, the height h of the tree is incremented by one. Since the top-most invocation of the recursion returned a failure, which would be for the root node of the tree, the process must be applied again with a tree of a greater height because there is no way to backtrack in the recursion. The process loops back to step 1108 to re-initialize the limit l before restarting the first invocation of the recursion with the new tree height h. With the height of the tree increased, this in the only situation where the longest navigation path will be longer than that in a balanced tree without clustering by similarity. Usually, this only happens when the number of video shots is slightly smaller than a power of the branching factor.

In step 1112, if the process of FIGS. 12A-B does not return an indication of failure, then the process of FIGS. 12A-B returned a tree. The process of FIG. 11 ends in step 1120.

FIGS. 12A-B show an example recursive process that applies the bottom-up hierarchical clustering process with temporal order, combined with top-down cluster element number limitation, according to embodiments of the present invention. This recursive process is invoked by the process in FIG. 11 and uses the initializations determined in FIG. 11 for the first iteration of recursion. The process begins in step 1200. In step 1210, each shot is placed in its own cluster to initialize the clustering. In step 1220, temporally adjacent clusters are paired. In step 1222, the pair with the smallest distance is found, using the distance function passed as one of the parameters on the invocation of the process of FIGS. 12A-B. As discussed above, each cluster is represented by a keyframe that can be the shot most similar to the other shots in the same cluster and least similar to shots in sibling clusters.

In step 1224, if the combined cardinality of clusters for the pair with the smallest distance found in step 1222 would exceed the cardinality limit l divided by the branching factor b, or l/b, or if the pair is marked as undesirable, then this pair is ignored. The process loops back to find the cluster pair with the next smallest distance in step 1226. For pairs of clusters that are ignored because the combined cardinality would exceed the cardinality limit, clusters may get merged that are less similar than other pairs of clusters, but this step limits the height of the tree. Pairs of clusters that are ignored because they are marked as undesirable are discussed below in relation to FIG. 12B.

In step 1224, if the combined cardinality of clusters for the pair with the smallest distance found in either step 1222 or step 1226 does not exceed the cardinality limit l divided by the branching factor b, or l/b, then the pair is merged in step 1228, replacing the two individual clusters with the merged cluster in the list of clusters. This limit l/b is used to keep the cluster tree balanced.

In step 1230, if there are a greater number of clusters than the branching factor, and if more subclusters can be merged in step 1232, then the process loops back to step 1220 to continue clustering. In step 1232, it is possible that no more clusters can be merged before the number of clusters has been reduced to the branching factor of the tree. For example, assume a branching factor of three and clusters A, B, C, and D. No more clusters can be merged when combining any two clusters would be too large, that is, the combined cardinality of the clusters for any of pairs AB, BC, or CD would exceed the limit l. Further, no more clusters can be merged if a cluster AB, BC, or CD will be marked undesirable. Additional details about undesirable clusters are discussed below in relation to FIG. 12B. In step 1230, if there are a greater number of clusters than the branching factor, and if no more clusters can be merged in step 1232, then in step 1234 this failure is returned to the invoker of the recursive clustering process, and the process ends in step 1280. Such a failure is handled below in the discussion related to FIG. 12B.

In step 1230 of FIG. 12A, if the number of clusters is less than or equal to the branching factor b, and if in step 1236 all clusters have not been processed, meaning that if each of the clusters has not yet been recursively processed, then connector 1 connects FIG. 12A to FIG. 12B.

FIG. 12B shows an example of recursive calls of the clustering process of FIGS. 12A-B for each cluster in the leaves of the tree. FIG. 12B also handles failure when FIGS. 12A-B return an indication of failure, which occurs when shots do not fit into a tree of a given height. The first iteration through FIGS. 12A-B started with clusters that contain only a single shot. Pairs of temporally adjacent clusters were merged until there were only b clusters left. For of each of those b clusters, if the leaves of the tree contain more subclusters than the branching factor b, the process in FIGS. 12A-B is applied recursively. Each time the process in FIGS. 12A-B is called and a tree is returned, a new subtree is generated.

In step 1240, the limit "l2" for the number of leaves in the cluster tree to be constructed for the next of the b clusters is initialized to be the maximum number of leaves $b^x$, or limit $l2=b^x$. This "x" is the smallest power of the branching factor that is not smaller than the number of shots of the next combined cluster to be processed, such that $b^x>=x$. This limit will be used in the process later as l/b to keep the cluster tree balanced. Assume the example above for a branching factor of b=6 and a number of shots n=100, as well processing of the first iteration of the recursion. This limit for the number of elements in each cluster is the smallest balanced tree that can hold the shots as leaves, or the maximum number of leaves in the tree $b^h=216$ found in step 1106, divided by the branching factor b=6, or 216/6=36. Alternatively, the new limit for the number of elements in a cluster can be the largest power of the branching factor that is smaller than the number of elements in the cluster to be divided. In this case, the generated subtree may have shorter navigation paths at the expense of grouping similar shots together.

In step 1242, the recursive process in FIGS. 12A-B is invoked with three parameters, which are the list of shots for the next combined cluster, a distance function, and the limit l2 initialized in step 1240. Parameter limit l2 becomes limit l starting in FIG. 12A at step 1200.

In step 1244, if the process of FIGS. 12A-B do not return an indication of failure, then connector 2 connects FIG. 12B to FIG. 12A, and the process lops back to process any more combined clusters in step 1236. In step 1244, if the process of FIGS. 12A-B return an indication of failure, then in step 1246 the limit l2 can be increased by a factor of b, the branching factor, or l2=l2*b.

In step 1248, if the limit l2 for the number of elements in the cluster was less than the previous limit divided by the branching factor, the process loops back to step 1242 with the new limit l2 and recursion is reapplied to the same cluster. The following is an example of when the limit can be less than the previous limit divided by the branching factor. Assuming four clusters A, B, C, and D, a branching factor of four, and the following cardinalities: A: 10; B: 20; C: 50; D: 30. The maximum number of leaves of the tree would be $b^h=4^4=256$, and the limit for each subcluster would be $b^h/b=4^3=64$. However, the cardinality of A is not greater than $4^2=16$ so that it could fit into a subtree of height two. If later constructing a tree of height two fails for A, the process can be invoked again for A with a height of three.

In step 1248, if the limit l2 for the number of the elements in the cluster was greater than the previous limit divided by the branching factor, in step 1254, the cluster is marked as undesirable. The process backtracks to the next higher level of the tree in the recursion in step 1256. In step 1258, the process backtracks in the clustering to the point before the undesirable cluster was created by merging two clusters. Connector 3 connects FIG. 12B to step 1220 of FIG. 12A. The invoker of the recursive process of FIGS. 12A-B can then continue clustering from the point in the backtracking found in step 1258, with the new limit l2 determined in step 1246. Clusters marked as undesirable are treated just like clusters that would exceed the limit for the number of elements, that is, they are ignored when looking for pairs of clusters that could be merged.

For example, assume that there are four subclusters in temporal order: A, B, C, and D. B and C have the least distance and are combined into the single cluster BC. When applying the process recursively to the cluster BC, it cannot fit into a tree of the given height, and the process of FIGS. 12A-B return an indication of failure, and in step 1254 of FIG. 12B, the cluster BC is marked as undesirable. The process backtracks within the recursion to the point with four subclusters, where B and C were merged to form BC. The cluster BC is marked as undesirable in step 1260. At this time, the invoker of the recursive process can still attempt to combine A and B or C and D and then to apply the process recursively to either AB or CD. This assumes that AB and CD have not previous been marked as undesirable and that their cardinality does not exceed the limit.

Returning to step 1230, if the number of clusters is equal to or fewer than the branching factor b, and if all the combined clusters have been processed in step 1236, then in step 1270 the tree is returned to the invoker of the recursive clustering process, and the process ends in step 1280.

III. Evaluation

Figure 14:
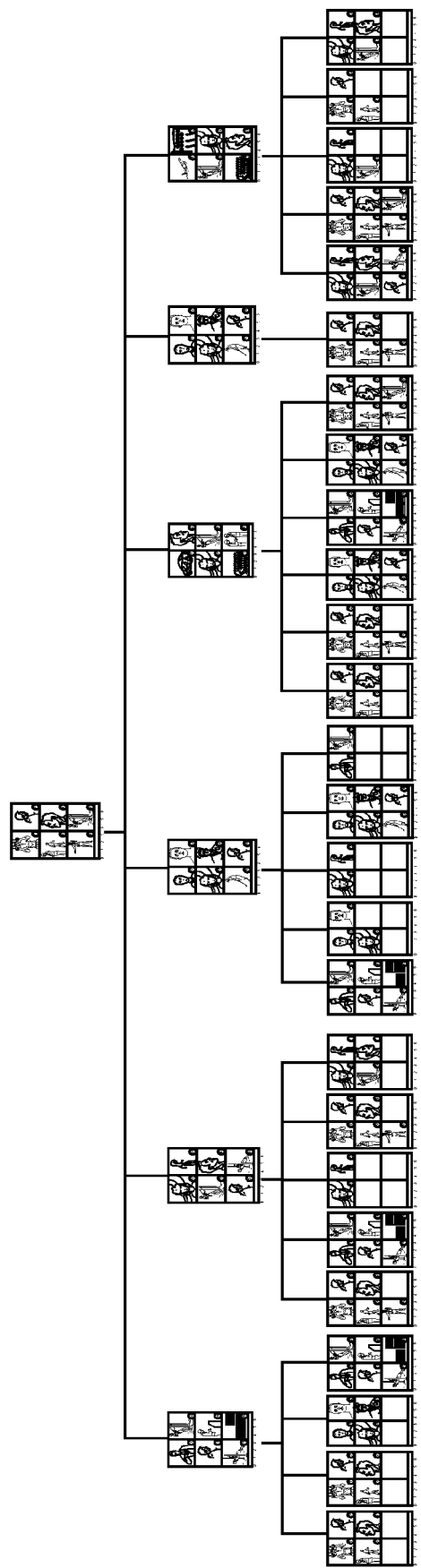
FIG. 14 shows an example resulting tree with similarity clustering and tree height constraint, according to embodiments of the present invention.
Figure 15:
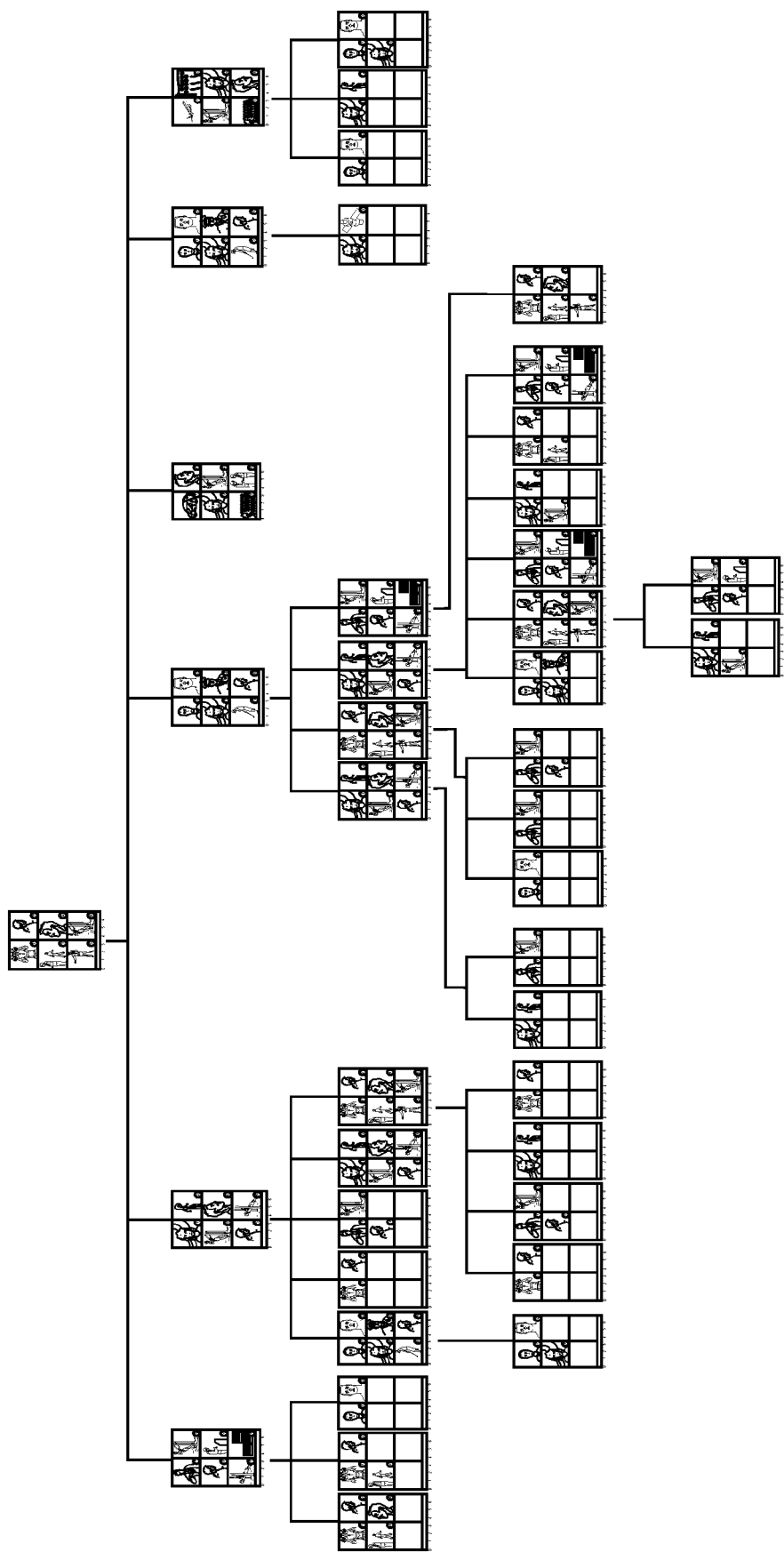
FIG. 15 shows an example resulting tree with similarity clustering and without limit to tree height, according to embodiments of the present invention.

In embodiments, the initial design and layout processes are Java-based. For a particular test video that contains 129 shots, process 2 of the present invention was compared to two alternative processes, 1 and 3. The resulting trees of the processes are shown in FIGS. 13-15.

Figure 13:
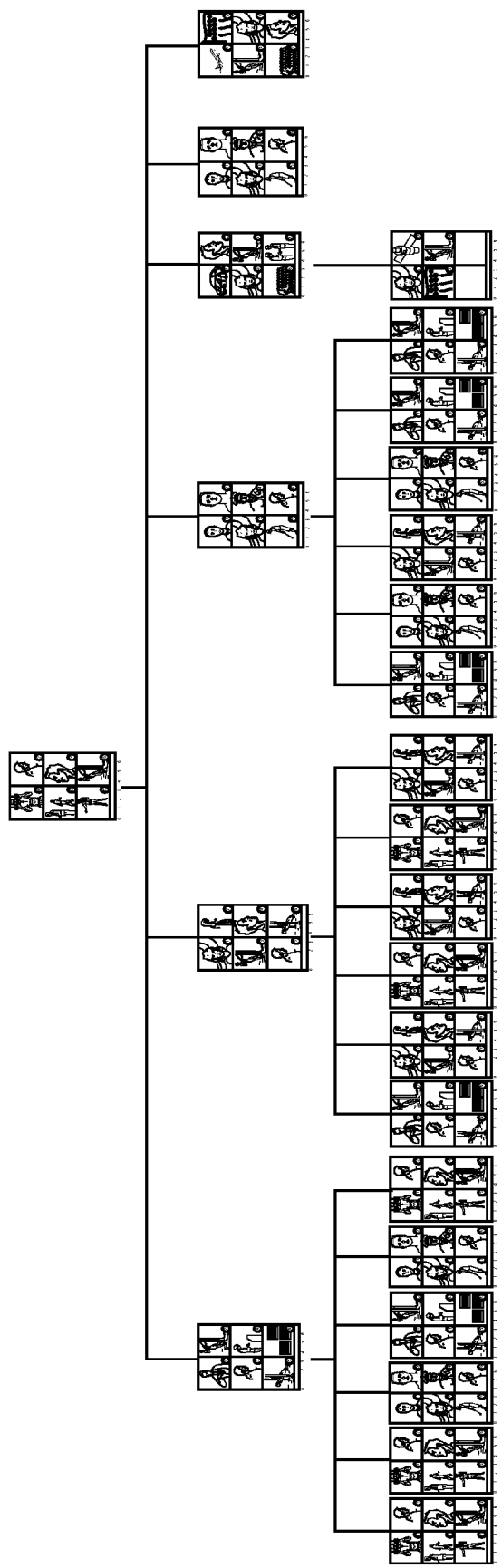
FIG. 13 shows an example resulting balanced tree without similarity clustering, according to embodiments of the present invention.

For alternative 1, FIG. 13 shows an example resulting balanced tree without similarity clustering. This balanced tree is filled on the left side. For alternative 2, FIG. 14 shows an example resulting tree with similarity clustering and tree height constraint, according to embodiments of the present invention. This alternative is discussed in relation to FIGS. 1-12B above. For alternative 3, FIG. 15 shows an example resulting tree with similarity clustering and without limit to tree height.

Alternatives 1 and 2 each produced a tree with a height of 3. Alternative 3 produced a tree with a height of 5. FIG. 16 shows an example table comparing process results for processes producing the trees in FIGS. 13-15, according to embodiments of the present invention. For rows one through five, the table lists the number of video shots that are reachable by a navigation path of a particular length for each alternative.

As shown in FIG. 16, the average navigation path length of 2.92 for alternative 2, the balanced agglomerative hierarchical clustering process with temporal order, which is slightly higher than the average navigation path length of 2.87 for alternative 1, the pure balanced approach. Alternative 3, the clustering approach without balancing, has a significantly higher average path length of 3.37 and also a much higher maximum path length of five than alternative 2.

IV. System Hardware, Software, and Components

Figure 17:
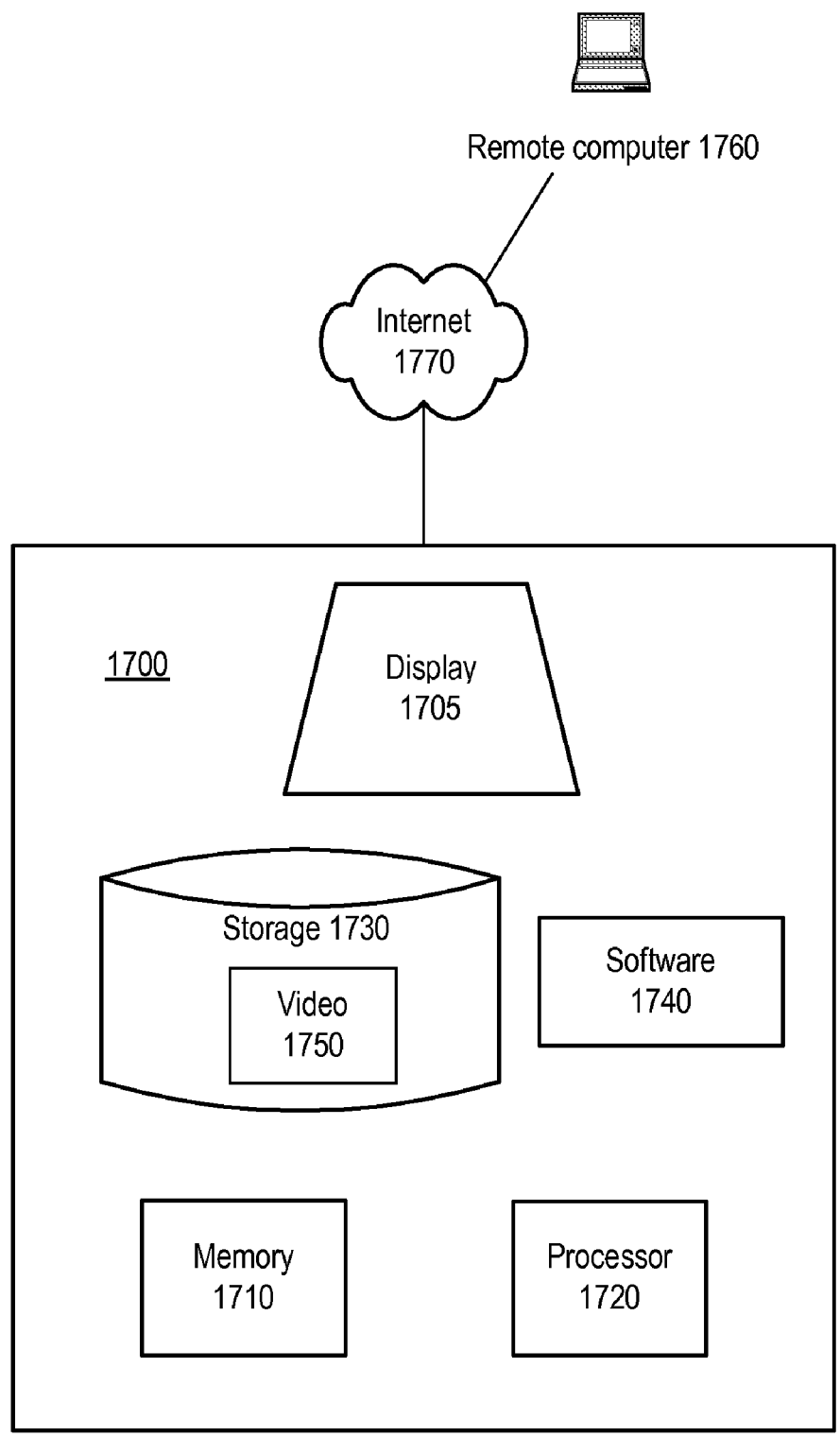
FIG. 17 shows an example display device and video browser, according to embodiments of the present invention.

FIG. 17 shows an example display device and video browser, according to embodiments of the present invention. The display device 1700 typically includes a display 1706, one or more memories 1710, one or more processors 1720, and one or more storage devices or repositories 1730 of some sort. The device 1700 further includes software 1740, which in turn includes the video browser that enables the user to navigate a video, according to embodiments. In embodiments, the software is Java-based. The device 1700 stores video 1750, for example, in the storage devices 1730. Alternatively, storage devices 1730 and/or software 1740 reside on a remote computer 1760 accessed via the Internet 1770. Although the focus of the present invention is on smaller display devices, such as a mobile phone or a personal digital assistant (PDA), the display device can also be any other larger device, such as a computer or television.

Embodiments of the present invention can include computer-based methods and systems which can be implemented using a conventional general purpose or a specialized digital computer(s) or microprocessor(s), programmed according to the teachings of the present disclosure. Appropriate software coding can readily be prepared by programmers based on the teachings of the present disclosure. Embodiments of the present invention can include a program of instructions executable by a computer to perform any of the features presented herein.

Embodiments of the present invention can include a computer readable medium, such as a computer readable storage medium. The computer readable storage medium can have stored instructions which can be used to program a computer to perform any of the features presented herein. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, flash memory or any media or device suitable for storing instructions and/or data. The present invention can include software for controlling both the hardware of a computer, such as a general purpose/specialized computer(s) or microprocessor(s), and for enabling them to interact with a human user or other mechanism utilizing the results of the present invention. Such software may include, but is not limited to, device drivers, operating systems, execution environments/containers, user interfaces, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. It is to be understood that other embodiments of the invention can be developed and fall within the spirit and scope of the invention and claims. The embodiments were chosen and described in order to best explain the principles of the invention and its practical application, thereby enabling others of ordinary skill in the relevant arts to understand the invention for various embodiments and with various modifications that are suited to the particular use contemplated. It is intended that the scope of the invention be defined by the following claims and their equivalents.

What is claimed is:

1. A computer-based-method for enabling navigation of video using a keyframe-based video browser on a display device, comprising the steps of:
   determining a number of keyframes the display device is capable of displaying, wherein each keyframe is a frame of a point in time in the video;
   segmenting a video into video shots, wherein each video shot includes one or more keyframes;
   determining a number of video shots within the video;
   clustering the video shots according to visual similarity;
   placing the video shots in order according to temporal position with respect to other video shots in the same cluster; and
   producing a hierarchically organized navigation tree for the clusters of video shots, wherein producing the navigation tree includes minimizing the path lengths of the navigation tree by
   determining a height of the tree such that the number of keyframes the display device is capable of displaying raised to a power equal to the height of the tree is greater than or equal to the number of video shots, and
   determining a maximum number of video shots in each cluster, wherein the maximum number of video shots in each cluster is less than the number of keyframes the display device is capable of displaying raised to the power equal to the height of the tree divided by the number of keyframes the display device is capable of displaying.

2. The computer-based method of claim 1, wherein clustering the video shots comprises determining the maximum number of video shots in each cluster as $b^h$,
   wherein a branching factor b comprises the maximum number of keyframes the display device is capable of displaying; and
   wherein a height of the tree h comprises the smallest height such that $b^h$ is greater than or equal to the number of video shots.

3. The computer-based method of claim 2, wherein clustering the video shots further comprises:
   merging pairs of clusters that have temporally adjacent video shots and skipping pairs of clusters where the merged cluster has more than a limit of $b^{h-1}$ video shoots; and
   stopping merging once there are b clusters.

4. The computer-based method of claim 3, wherein clustering the video shots further comprises:
   recursively clustering the video shots of subclusters, and reducing a maximum number of video shots for each cluster by a factor of b before each level of recursion.

5. The computer-based method of claim 4, wherein producing a hierarchically organized navigation tree comprises:
   if subclustering a cluster produces more than b subclusters because there are no more subclusters that can be merged, then
   marking the cluster as undesirable;
   backtracking in the clustering at a higher level to a point where the undesirable cluster was created; and
   repeating clustering while treating undesirable clusters like clusters that would exceed the limit of elements.

6. The computer-based method of claim 5, wherein if a root of the navigation tree has more than b subclusters, incrementing a maximum height of the navigation tree and repeating clustering from the start of clustering.

7. The computer-based method of claim 1, further comprising displaying a hierarchically-organized video on the display device, wherein the hierarchically-organized video is displayed using keyframes, and wherein the most important shot in the cluster overlaid with the first shot in the cluster.

8. The computer-based method of claim 1, further comprising:
   displaying a timeline to the display device, showing a portion of the video associated with each cluster; and
   displaying context-sensitive help to the display device to aid the user in navigation through the tree.

9. A system for enabling navigation of video using a keyframe-based video browser on a display device, comprising:
   a display device, wherein the display device is capable of displaying a number of keyframes, and wherein each keyframe is a frame of a point in time in the video;

a video segmented into video shots, wherein each video shot includes one or more keyframes, and wherein a number of video shots within the video are determined, and wherein the video shots are clustered according to visual similarity, while temporal order of the video shots is maintained; and a hierarchically organized navigation tree produced from the clustered video shots, wherein producing the navigation tree includes minimizing the path lengths of the navigation tree by determining a height of the tree such that the number of keyframes the display device is capable of displaying raised to a power equal to the height of the tree is greater than or equal to the number of video shots, and determining a maximum number of video shots in each cluster, wherein the maximum number of video shots in each cluster is less than the number of keyframes the display device is capable of displaying raised to the power equal to the height of the tree divided by the number of keyframes the display device is capable of displaying.

10. The system of claim 9, wherein clustering the video shots comprises determining the maximum number of video shots in each cluster as $b^h$, wherein a branching factor b comprises the maximum number of keyframes the display device is capable of displaying; and wherein a height of the tree h comprises the smallest height such that $b^h$ is greater than or equal to the number of video shots.

11. The system of claim 10, wherein the clustered video shots further comprise:

a merge of pairs of clusters that have temporally adjacent video shots and a skip of pairs of clusters where the merged cluster has more than a limit of $b^{h-1}$ video shots; and a stop of the merge once there are b clusters.

12. The system of claim 11, wherein the clustered video shots further comprise:

a recursive cluster of the video shots of subclusters, and a reduction of a maximum number of video shots for each cluster by a factor of b before each level of recursion.

13. The system of claim 12, wherein if a cluster contains more than b subclusters because there are no more subclusters that can be merged, then the cluster comprises being marked as undesirable;

the point in the clustering is determined by a backtrack in the clustering at a higher level to a point where the undesirable cluster was created; and a repeat of the cluster of the elements from the point in the clustering is performed, while undesirable clusters are treated like clusters that would exceed the limit of elements.

14. The system of claim 13, wherein if a root of the navigation tree has more than b subclusters, the maximum height of the navigation tree is incremented and the clustering is repeated from the start of the clustering.

15. The system of claim 14, further comprising a display of a hierarchically organized video on the display device, wherein the hierarchically-organized video is displayed using keyframes, and wherein of the most important shot in the cluster overlaid with the first shot in the cluster.

16. The system of claim 15, further comprising:

a display of a timeline to the display device, showing a portion of the video associated with each cluster; and a display of context-sensitive help to the display device to aid the user in navigation through the tree.

17. A non-transitory computer readable storage medium storing one or more sequences of instructions for enabling navigation of video using a keyframe-based video browser on a display device, wherein said instructions, when executed by one or more processors, cause the one or more processors to execute the steps of:

determining a number of keyframes the display device is capable of displaying, wherein each keyframe is a frame of a point in time in the video;

segmenting a video into video shots, wherein each video shot includes one or more keyframes;

determining a number of video shots within the video;

clustering the video shots according to visual similarity;

placing the video shots in order according to temporal position with respect to other video shots in the same cluster; and producing a hierarchically organized navigation tree for the clusters of video shots, wherein producing the tree includes minimizing the path lengths of the navigation tree by determining a height of the tree such that the number of keyframes the display device is capable of displaying raised to a power equal to the height of the tree is greater than or equal to the number of video shots, and determining a maximum number of video shots in each cluster, wherein the maximum number of video shots in each cluster is less than the number of keyframes the display device is capable of displaying raised to the power equal to the height of the tree divided by the number of keyframes the display device is capable of displaying.

18. The non-transitory computer readable storage medium of claim 17, wherein clustering the video shots comprises determining the maximum number of video shots in each cluster as $b^h$, wherein a branching factor b comprises the maximum number of keyframes the display device is capable of displaying; and wherein a height of the tree h comprises the smallest height such that $b^h$ is greater than or equal to the number of video shots.

19. The non-transitory computer readable storage medium of claim 18, wherein clustering the video shots further comprises:

merging pairs of clusters that have temporally adjacent video shots and skipping pairs of clusters where the merged cluster has more than a limit of $b^{h-1}$ video shoots; and stopping merging once there are b clusters.

20. The non-transitory computer readable storage medium of claim 17, further comprising displaying a hierarchically-organized video on the display device, wherein the hierarchically-organized video is displayed using keyframes, and wherein the most important shot in the cluster overlaid with the first shot in the cluster.

* * * * *